United States Patent
Tiberghien et al.

(10) Patent No.: US 8,028,718 B2
(45) Date of Patent: Oct. 4, 2011

(54) QUICK COUPLING ELEMENT AND A QUICK COUPLING INCLUDING SUCH AN ELEMENT

(75) Inventors: Alain Christophe Tiberghien, Sevrier (FR); Christophe Durieux, Gilly sur Isere (FR)

(73) Assignee: Staubli Faverges, Faverges (FR)

( * ) Notice: Subject to any disclaimer, the term of this patent is extended or adjusted under 35 U.S.C. 154(b) by 580 days.

(21) Appl. No.: 12/219,284

(22) Filed: Jul. 18, 2008

(65) Prior Publication Data
US 2009/0033089 A1 Feb. 5, 2009

(30) Foreign Application Priority Data
Jul. 30, 2007 (FR) ...................................... 07 05555

(51) Int. Cl.
*F16L 37/00* (2006.01)
(52) U.S. Cl. ........... 137/614.03; 137/614.04; 251/149.1; 251/149.6
(58) Field of Classification Search ................. 137/614, 137/614.03, 614.04, 614.05; 251/149.1, 251/149.6
See application file for complete search history.

(56) References Cited

U.S. PATENT DOCUMENTS

| 4,344,455 | A | * | 8/1982 | Norton et al. ................. 137/614 |
| 5,016,671 | A | * | 5/1991 | Barwise ................... 137/614.04 |
| 5,191,914 | A | | 3/1993 | Gonzalez |
| 5,398,723 | A | | 3/1995 | Allread et al. |
| 5,762,106 | A | | 6/1998 | Smith, III |
| 6,866,064 | B2 | * | 3/2005 | Nanni et al. ............. 137/614.03 |

FOREIGN PATENT DOCUMENTS
FR 2864 604 A 7/2005
* cited by examiner

*Primary Examiner* — Kevin Lee
(74) *Attorney, Agent, or Firm* — Dowell & Dowell, PC

(57) ABSTRACT

A coupling element including a body for fastening to a support and a coupling member fitted with a closure valve member and mounted in the body such that the member can pivot, a sealing gasket is disposed between the body and the coupling member and the element also includes a spring which exerts a resilient force on a flange portion of the coupling member, which force is directed towards the rear of the coupling element and is suitable for pressing a first surface of the coupling element against a surface of the body, and the coupling member is provided with a second surface for bearing against an axial abutment in the event of the coupling member moves towards a front of the coupling element relative to the body.

17 Claims, 3 Drawing Sheets

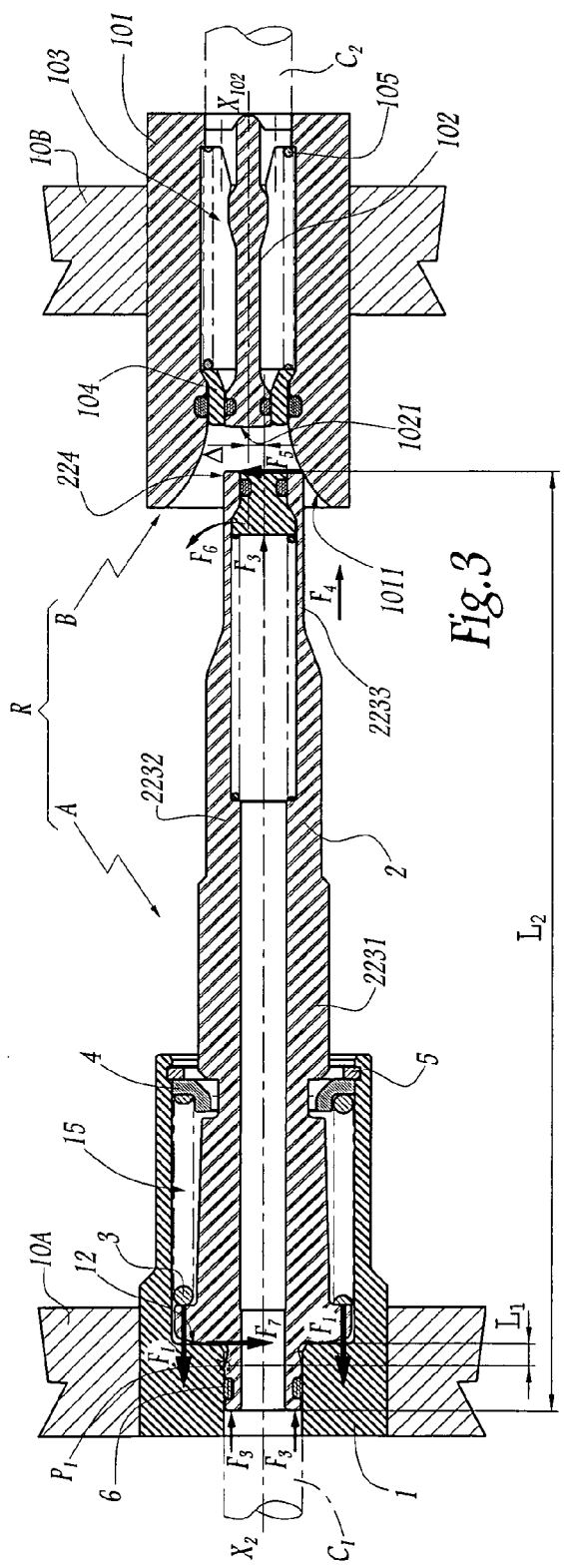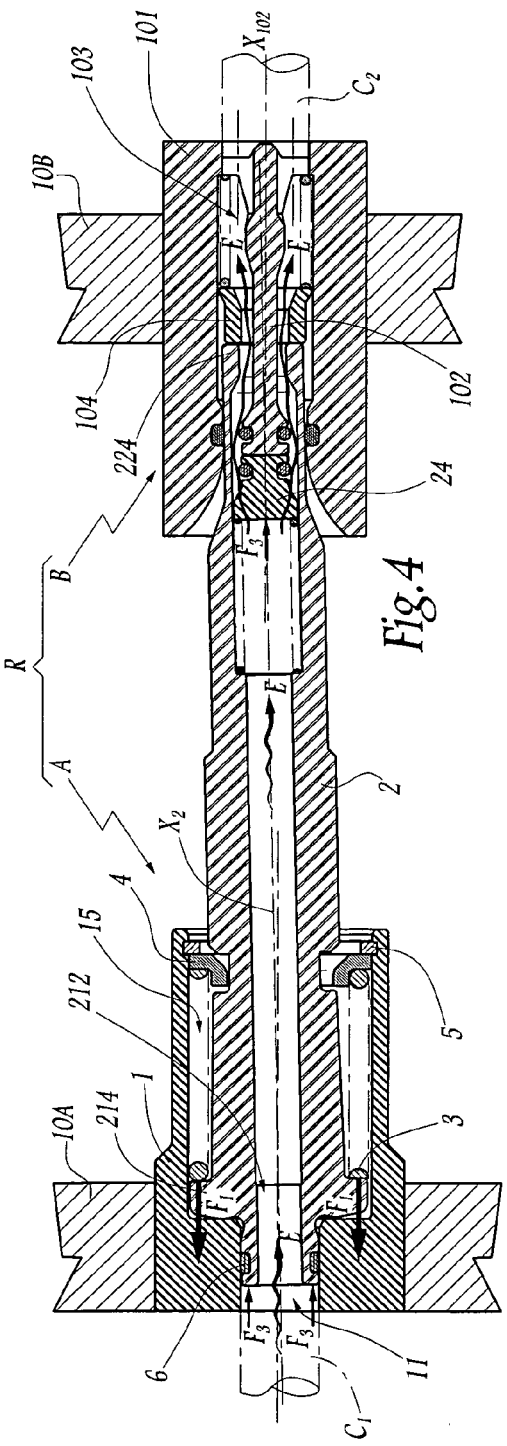

QUICK COUPLING ELEMENT AND A QUICK COUPLING INCLUDING SUCH AN ELEMENT

BACKGROUND OF THE INVENTION

1. Field of the Invention

The present invention relates to a quick coupling element for releasably connecting together two pipes. Such a male or female element is designed to be coupled to a complementary female or male element in order to put two pipes of fluid under pressure into communication. The invention also relates to a quick coupling including, amongst other elements, such a coupling element.

2. Description of the Related Art

Generally, the male and female elements of a quick coupling are coupled together by aligning a longitudinal axis of the male element on a longitudinal axis of the female element. In certain applications, these male or female elements are mounted on plates that are moved by robots. This applies in particular in applications for circulating cooling fluid, e.g. in the field of molding parts out of plastics material. Such a technique can also be used for coupling pipes together under water. It can happen that the longitudinal axes of the two elements of a coupling that are to be coupled together are laterally offset relative to each other. To mitigate that difficulty, it is known, e.g. from US 2005 164538, to use a coupling element that is mounted to pivot relative to a body, thereby enabling leaktight coupling to be obtained in spite of not being in alignment.

In certain couplings with a pivoting coupling member, the axial position of the coupling member in the corresponding body depends on the fluid pressure present in an upstream pipe connected to the coupling element, with a sealing gasket serving solely to bring the coupling element towards a middle position on uncoupling. While a male element is being coupled in a female element, torque is generated by friction, with such friction-generated torque increasing with increasing pressure of the fluid present in the pipes connected to the coupling element that includes the coupling member, said torque opposing pivoting of the coupling member. This friction torque is exerted via a contact zone between the coupling member and the body of the coupling element, which contact zone is formed on the front of the coupling member, i.e. on a portion of said member that faces towards the other coupling element. The friction force is thus exerted at an axial distance from the hinge point between the coupling member and the body, which distance is relatively long, such that the friction force exerts a considerable opposing torque. Thus, in the event of non-alignment between the end of the male element of a coupling and the female element a high level of torque needs to be exerted in order to enable the coupling member to pivot and coupling to take placed with the complementary female element, thereby leading to premature wear on the entry surface of the female element and on the peripheral surface of the male element. The reliability and the lifetime of the coupling are thus decreased. Furthermore, this limits the amount of misalignment that the quick coupling including such a prior art coupling is capable of accommodating.

SUMMARY OF THE INVENTION

The invention seeks more particularly to remedy those drawbacks by proposing a novel coupling element in which a friction force exerted during coupling of the male and female elements does not significantly impede pivoting of one of the coupling members relative to a stationary body.

To this end, the invention provides an element of a quick coupling for releasably connecting together two pipes, the element comprising a body for fastening on a support, and an elongate coupling member fitted with a closure valve member and mounted in the body with the possibility of pivoting, a sealing gasket being disposed between the above-mentioned body and coupling member. This coupling element characterized in that it comprises a spring exerting a resilient force on a flange portion of the coupling member that faces towards the rear of the coupling element and that is suitable for pressing a first surface of the coupling member against a surface of the body, and in that the coupling member is provided with a second surface suitable for bearing against an axial abutment in the event of the coupling member being moved towards the front of the coupling element relative to the above-mentioned body.

In the meaning of the present invention, the front of a male or female coupling element is turned towards the complementary female or male element of the coupling while they are being engaged, whereas the rear of a coupling element faces away from the other element, towards the pipe that is connected to the coupling element.

By means of the invention, the friction force between the pivoting coupling member and the stationary body acts between a first surface of the coupling member and a corresponding surface of the body that can be placed at a relatively short axial distance from a pivot point of the coupling member on the body. Thus, the torque that results from the friction force and that opposes pivoting of the coupling member is relatively small. The force that needs to be exerted on the end of the coupling member in order to enable the male and female elements to be engaged in the event of their respective longitudinal axes being laterally offset is therefore relatively small. The wear at the entry surface of the female element and the peripheral surface of the male element is greatly diminished and the lifetime of the coupling is increased. Furthermore, co-operation between the second surface and the abutment guarantees safe operation of the coupling, even in the event of the spring failing or in the event of the pressure in the upstream pipe becoming momentarily excessive. Finally, the friction force to be overcome while coupling together male and female elements having axes that are offset is inversely proportional to the pressure in the pipe connected to the element that includes the pivoting coupling member.

According to aspects of the invention that are advantageous but not essential, such a coupling element may incorporate one or more of the following characteristics:

- The resultant of the resilient force presents a magnitude greater than the magnitude of the resultant of the nominal pressure force exerted on the coupling member by the fluid present in a pipe connected to the body.
- The sealing gasket is placed in a groove formed at the periphery of a projecting rear end of the first surface, said portion being substantially cylindrical on a circular base and being received in a hollow housing of corresponding shape, in the body. Under such circumstances, a portion of the outer radial surface of the projecting rear end that is situated, relative to the groove, beside the first surface, is of a diameter that is greater than the diameter of another portion of the outer radial surface of the projecting rear end that is situated, relative to the groove, opposite from the first surface.
- The axial distance between, firstly, the edge of the groove situated on the side of the groove that is beside the first surface and, secondly, the front end of a radial surface of the hollow housing for receiving the projecting rear end, presents a value that is strictly greater than the value of the axial distance between the second surface of the coupling member and the abutment.

The axial abutment is formed by a component fitted inside the body.

The spring is placed around the coupling member in a housing formed by the body. Advantageously, the spring is disposed between the axial abutment and an outer shoulder of the coupling member that faces towards the front of the element.

The coupling member comprises two portions, a rear portion received in the body and forming the first and second surfaces, and a front portion projecting from the body. Under such circumstances, provision can be made for the inside diameter of the axial abutment to be less than the maximum outside diameter of one or more zones of the coupling member disposed between the axial abutment and the front end of the coupling member.

The element constitutes a male element of the coupling.

The front end of the coupling member for penetrating into a corresponding female coupling element has a diameter less than the diameter of at least one intermediate zone of the coupling member that projects beyond the body.

The body is suitable for being fastened on a drive plate supporting a plurality of coupling members.

The invention also provides a quick coupling for releasably joining together two pipes, which coupling includes, amongst other elements, a first coupling element as defined above.

Advantageously, the second element of the coupling has a flared entry surface suitable for receiving one end of the coupling member bearing slidably thereagainst. In addition, provision can be made for the second coupling element to be fitted with a closure valve member. Advantageously, the second coupling element includes a pusher suitable for applying an axial force on the valve member of the first element to move said valve member relative to the coupling member, and the front face of the pusher is domed.

BRIEF DESCRIPTION OF THE DRAWINGS

The invention can be better understood and other advantages thereof appear more clearly in the light of the following description of an embodiment of a coupling element and of a coupling in accordance with the principles of the invention, given purely by way of example and made with reference to the accompanying drawings, in which:

FIG. 3 is a section view analogous to FIG. 1 while the male and female elements of the coupling are being engaged, with said elements being offset laterally; and FIG. 4 is a section view analogous to FIG. 1 showing the coupling in the coupled-together configuration, with the male and female elements being offset laterally.

DESCRIPTION OF THE PREFERRED EMBODIMENTS

Figure 1:
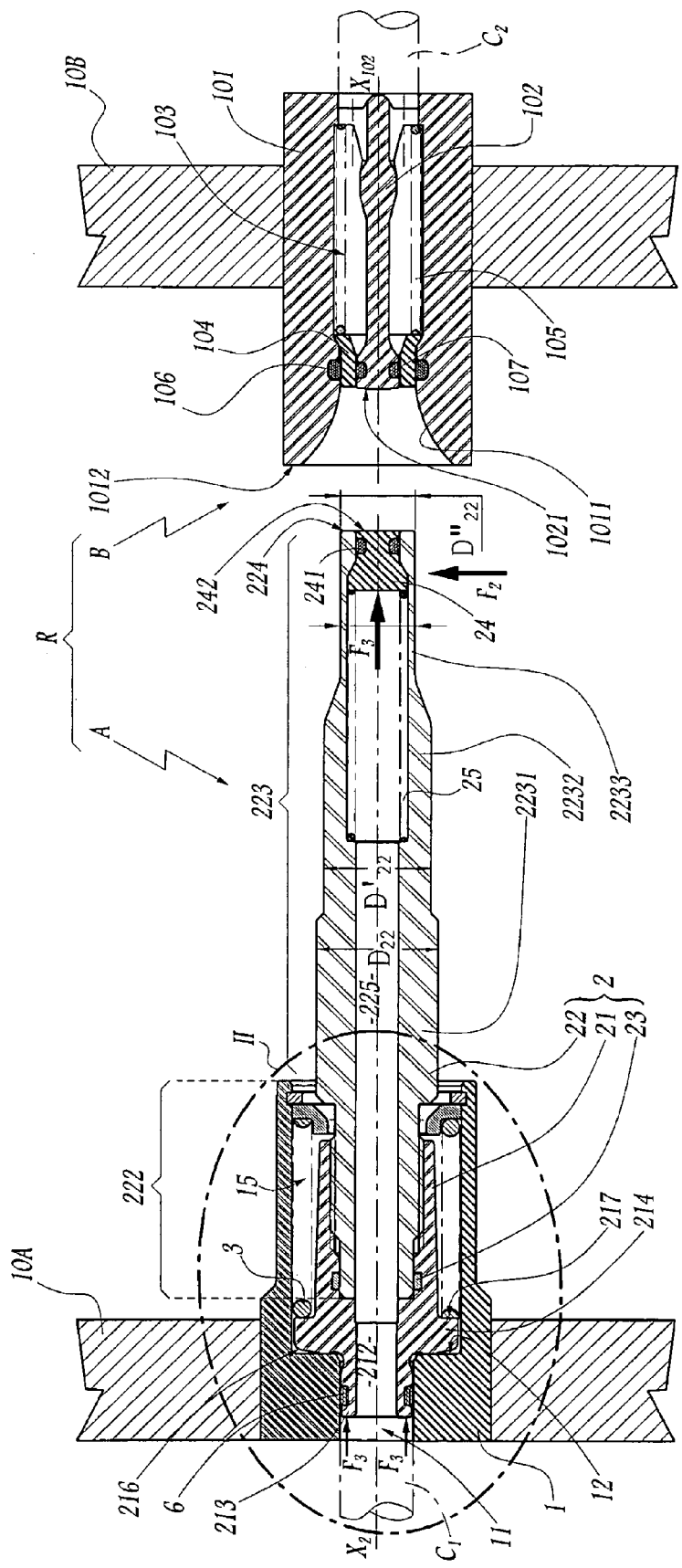
FIG. 1 is a longitudinal section of a coupling in accordance with the invention, including an element in accordance with the invention and shown in an uncoupled configuration.

The coupling R shown in FIGS. 1 to 4 comprises a male element or endpiece A and a female element B that are coupled respectively to an upstream pipe $C_1$ and to a downstream pipe $C_2$. The upstream pipe $C_1$ is itself coupled to a source of fluid under pressure (not shown), e.g. a pump delivering a cooling liquid at a pressure of 15 bar.

The uncoupled male element A comprises a body 1 that is held stationary by screw fastening in a plate 10A that is designed to be moved by a robot and that has other coupling elements (not shown) mounted thereon. The body 1 can be prevented from moving relative to the plate 10A by other means, e.g. it could be welded or held in place by co-operating shapes.

The male element A also comprises a coupling member 2 that is elongate in shape and that is engaged in part in an inner housing 15 of the body 1. The member 2 comprises a rear portion 21 and a front portion 22 that are assembled together by screw fastening, with a sealing gasket 23 being interposed between them. The rear portion 21 includes tapping 211 that co-operates with an outside thread 221 of the front portion 22 in order to assemble the portions 21 and 22 together. To clarify the drawings, the member 2 is shown as a single piece in FIGS. 3 and 4, however its structure can be seen clearly in FIGS. 1 and 2.

The longitudinal axis of the member 2 is referenced $X_2$. The portions 21 and 22 are cylindrical on a circular base centered on the axis $X_2$.

The rear portion 21 is hollow and defines a duct 212 through which fluid under pressure flows, the duct being centered on the axis $X_2$. The rear portion 21 has a rear end 213 engaged in an axial duct 11 of the body 1 that extends the housing 15 and that has a diameter written $D_{11}$. The pipe $C_1$ is connected to the duct 11. The outside diameter of the rear end 213 matches the diameter $D_{11}$ so as to enable the rear end 213 to be inserted in the duct 11 with little clearance.

The rear portion 21 also has a flange portion 214 forming two outer shoulders and of diameter that is significantly greater than the diameter $D_{11}$. References 216 and 217 respectively designate the surfaces of the portion 214 that are generally perpendicular to the axis $X_2$, facing towards the rear and towards the front of the element A and defining the shoulders. The first surface 216 is convex, whereas the surface 217 is substantially plane. Going from the flange portion 214 towards the front of the element A, the rear portion 21 forms a skirt 215 that carries the tapping 211 on its inside.

Reference 12 designates the annular surface surrounding the duct 11 and forming the end wall of the housing 15. The surface 12 receives the surface 216 bearing thereagainst.

The rear end 213 projects rearwards from the first surface 216 so as to be engaged in the duct 11.

A helical spring 3 is mounted around the rear portion 21 in the housing 15 between the surface 217 and an axial abutment formed by a ring 4 received in the housing 15 and held in place in the housing by means of a stop segment 5 formed by a spring clip received in an inside groove 13 in the body 1.

The spring 3 is compressed between the surface 217 and a surface 41 of the ring 4 that faces towards the surface 12, in such a manner as to exert on the flange portion 214 a resilient force $F_1$ that normally presses the surface 216 against the surface 12. Reference $L_3$ designates the working length of the spring 3 constituted by the axial distance between surfaces 41 and 217.

The front portion 22 projects out from the housing 15. Reference 222 designates the fraction of the front portion 22 that is received in the housing 15 and reference 223 designates the fraction of said portion that projects forwards from the body 1.

The outside diameter of the fraction 223 decreases on approaching the front end 224 of the front portion 22. More precisely, the outside diameter of the front portion 22 takes on three values that decrease on going away from the ring 4 and on approaching the end 224, namely $D_{22}$, $D'_{22}$, and $D''_{22}$. Three zones 2231, 2232, and 2233 of the fraction 223 are defined having respective diameters $D_{22}$, $D'_{22}$, and $D''_{22}$. It should be observed that the zone 2231 extends to the inside of the housing 15, in register with the spring clip 5. In a variant, only two zones of different diameter need be provided on the fraction 223.

The member 2 is fitted with a valve member 24 mounted in the central duct 225 of the front portion 22 in the vicinity of the end 224. This valve member is fitted with a sealing gasket 241 and is loaded by a spring 25 so as to press against a seat formed by the inside surface of the front surface 22 in the vicinity of its front end 224. The front face 242 of the valve member 24 is plane and flush with the annular end surface of the front portion 22 that surrounds it when the valve member 24 is in its closed configuration.

The rear end 213 is provided with a groove 218 that receives a sealing gasket 6 that bears against the radial surface 14 of the duct 11 and provides sealing between the duct 11 and the housing 15. Reference $B_1$ designates the edge of the groove 218 beside the pipe $C_1$. Reference $B_2$ designates the edge of the same groove beside the surface 216, i.e. beside the spring 3. Reference 2131 designates the portion of the outer radial surface of the rear end 213 that extends between the free tip of said end and the groove 218. The portion 2131 presents the diameter $D_1$. Reference 2132 designates the portion of the outer radial surface of the rear end 213 that extends between the groove 218 and a setback 2133 connecting with the first surface 216. The portion 2132 is of diameter $D_2$. The value of the diameter $D_1$ is less than the value of the diameter $D_2$, such that the surface portion 2132 forms a preferred bearing zone for the rear end 213 to bear against the surface 14, at a short axial distance from the first surface 216.

Figure 2:
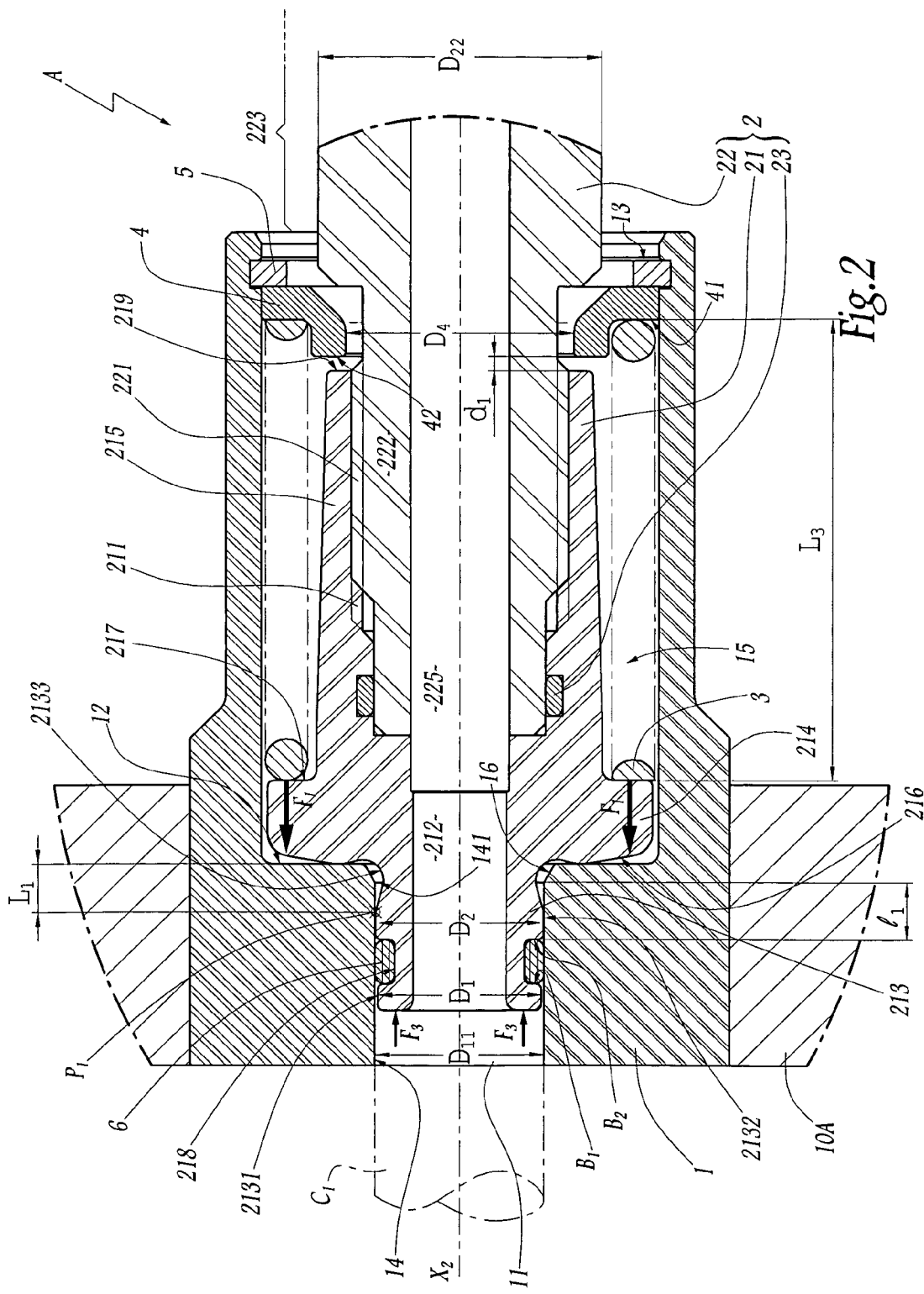
FIG. 2 is a view on a larger scale showing detail II of FIG. 1.

When a force $F_2$ perpendicular to the axis $X_2$ is exerted on the fraction 223, in particular in the vicinity of the end 224, the member 2 pivots about a bearing zone between the member 2 and the body 1. Because of the construction of the male element A, this bearing zone is situated at the rear of the member 2. In the description below, it is assumed that the member 2 bears against the body 1 at a pivot point $P_1$ created between the surface portion 2132 and the surface 14. The member 2 can thus pivot at the point $P_1$ about an axis perpendicular to the axis $X_2$ and to the plane of FIGS. 1 to 4. In the configuration of FIGS. 1 and 2, the member 2 does not pivot relative to the body 1. The position of the point $P_1$ is nevertheless identified in FIG. 2 in order to clarify the drawing.

The male element or endpiece A is assembled by inserting the gasket 6 in the groove 218. The gasket 23 is also put into place in the corresponding groove in the rear portion 21. The spring 3 is then placed around the skirt 215, bearing against the surface 217, and then the ring 4 is placed against the free end turn of the spring 3. The portion 22 is then screwed into the portion 21, thereby constituting a subassembly of the element A constituted by the member 2, the spring 3, the ring 4, and the gaskets 23 and 6. Since the inside diameter $D_4$ of the ring 4 is less than the diameter $D_{22}$, axial movement of the ring 4 towards the front of the member 2, under drive from the spring 3, is blocked by the zone 2231 of the fraction 223, thereby preventing untimely disassembly of the above-mentioned subassembly and making it easier to mount in the body 1.

The gasket 6 may be put into place in the groove 218 after the above-mentioned subassembly has been assembled.

The resulting subassembly can then be partially inserted into the housing 15 until the rear end 213 is inserted into the duct 11 and the surface 216 bears against the surface 12, after which the spring 5 can be put into place in the groove 13. In this configuration, the ring 4 compresses the spring 3 that maintains contact between the surfaces 216 and 12 by applying the force $F_1$.

In this configuration, the member 2 shuts the body 1. That is why it is sometimes referred to as a "shutter" or a "pivoting shutter".

The fluid present in the pipe $C_1$ exerts a pressure force $F_3$ on the member 2 tending to push this member forwards. The stiffness and the working length $L_3$ of the spring 3 are selected in such a manner that the resultant of the force $F_1$ exerted by the spring 3 against the surface 217 is stronger than the resultant of the force $F_3$ exerted on the member 2 by the nominal pressure of the fluid pressed in the pipe $C_1$. Because of the shapes of the parts, these resultants are parallel to the axis $X_2$. Thus, if the nominal pressure of the cooling fluid in the pipe $C_1$ is equal to 15 bar, then the spring 3 is dimensioned to press the flange portion 214 against the end wall 12 of the housing 15 so long as the pressure of the fluid in the pipe $C_1$ remains less than or equal to the value of 15 bar.

The female element B comprises a body 101 having a pusher 102 held stationary therein and defining a duct 103 for fluid flow. An annular valve member 104 is placed around the pusher 102, being loaded by a spring 105 towards a configuration in which it bears against a corresponding seat. Sealing gaskets 106 and 107 are provided in respective grooves in the body 101 and in the pusher 102. Reference $X_{102}$ designates the plurality axis of the pusher 102, which axis is also the central axis of the duct 103.

The body 101 forms a flared surface 1011 between the front surface of the valve member 104 in the closed configuration and the front face 1012 of the body 101. This inlet surface converges towards the pusher 102 and can receive the front end 224 of the member 2 bearing slidably thereagainst, while the elements A and B are being coupled together.

The front face 1021 of the pusher 102 is domed. It is convex, in the form of a spherical cap.

The body 101 is screwed in a plate 10B that can be moved closer to or further away from the plate 10A, as mentioned above. It is possible to fasten the body 101 in the plate 10B by other techniques.

In practice, each of the plates 10A and 10B carries a plurality of male or female coupling elements (not shown in order to clarify the drawings).

While engaging the elements A and B, the axes $X_2$ and $X_{102}$ are normally in alignment. Nevertheless, and as shown in FIG. 3, the axes $X_2$ and $X_{102}$ can be substantially parallel, but with a lateral offset A between them when the plates 10A and 10B are moved towards each other in a direction that is generally parallel to the axis $X_{102}$, and it must be possible to accommodate this offset.

When the member 2 comes into contact with the surface 1011, and given the advancing movement of the element A towards the element B as represented by arrow $F_4$ in FIG. 3, the front end 224 of the member 2 slides against the surface 1011, being subjected to a contact force with a component $F_5$ that is generally perpendicular to the axis $X_2$. This force component $F_5$ tends to pivot the member 2 relative to the body 1, as represented by arrow $F_6$ in FIG. 3.

At the end opposite along the axis $X_2$ from the end 224 that comes into contact against the surface 1011, the surface portion 2132 comes to bear against the surface 14, thereby forming the pivot point $P_1$ about which the member 2 pivots relative to the body 1. This point $P_1$ is then situated on a circle forming the front end of the surface portion 2132. During this pivoting, the spring 3 keeps the member 2 pressing locally against the surface 12 in a zone that is diametrically opposite the point of application of the component $F_5$ of the contact force relative to the axis $X_2$, while a portion of the first surface 216 separates from the surface 12. During this stage of the member 2 pivoting relative to the body 1, clearance exists between the member 2 and the ring 4 so there is no contact between these two parts. Thus, because of the relative movement of the surfaces 216 and 12, in their bearing zone, that results from the pivoting of the member 2, a friction force $F_7$ is generated at the interface between the surfaces 216 and 12.

The axial distance, i.e. the distance between the point $P_1$ and the surface 216 as measured parallel to the axis $X_2$, is written $L_1$. This distance $L_1$ corresponds to the length of the lever arm of the force $F_7$ opposing the pivoting $F_6$. The length $L_1$ is less than or equal to 20% of the total axial length $L_2$ of the member 2, which is of the same order of magnitude as the length of the lever arm for the radial component $F_5$ of the contact force exerted by the surface 1011 on the front end 224 and that tens to cause the member 2 to pivot about the point $P_1$. More generally, since the bearing zone for pivoting of the member 2 on the body 1 is situated at the rear of the member 2, i.e. close to contact surfaces between the member 2 and the body 1 where friction can arise and that are likewise situated at the rear of the member 2, the lever arm of order $L_1$ for each of the friction forces is much shorter than the lever arm of order $L_2$ for the component $F_5$. The force $F_5$ therefore does not need to be very great in order to overcome friction, thereby limiting the risk of the surface 1011 and the end 224 becoming damaged while these two portions slide relative to each other.

The front end 224 of the member 2 can thus slide over the surface 1011, thereby accentuating the pivoting $F_6$ of the member 2 in the body 1 until the front end 224 reaches the valve member 104 under the effect of the advancing movement $F_4$. As this movement continues, the pusher 102 pushes the valve member 24 into the inside of the duct 225, while the front annular face of the end 224 pushes the valve member 104 into the duct 103. This leads to the configuration of FIG. 4 in which the plates 10A and 10B are mechanically in abutment against each other via means that are not shown, and where the two pipes $C_1$ and $C_2$ are connected together, with it being possible for fluid to flow as represented by arrows E. In this configuration, the gasket 6 provides sealing between firstly the fluid circulation zone formed by the pipes and ducts $C_1$, 11, 212, 225, 103, and $C_2$, and secondly the housing 15, with this being true in spite of the pivoting of the member 2.

Since the diameter $D''_{22}$ is less than the diameter $D'_{22}$, the shape of the front end 224 of the member 2 matches the shape of the entry zone of the female element B, while the intermediate zones 2231 and 2232 of the fraction 223, lying outside the bodies 1 and 101 when the coupling is in the coupled-together position, are robust given their relatively large respective outside diameters $D_{22}$ and $D'_{22}$, which is advantageous since these intermediate zones are not protected from impacts.

The rear portion 21 is provided with an annular surface 219 that constitutes the front end of the skirt 215 and that comes to bear against the ring 4 in the event of excess pressure in the pipe $C_1$, i.e. in the event of the magnitude of the force $F_3$ increasing sufficiently to overcome the force $F_1$, such that the surfaces 216 and 12 are separated from each other and the member 2 moves towards the front of the element A relative to the body 1. The ring 4 then serves as an axial abutment against a movement that would otherwise tend to separate the member 2 axially from the body 1. The ring 4 also serves as abutment for the member 2 in the event of the spring 3 rupturing or weakening as a result of fatigue.

Reference $d_1$ denotes the axial distance between the surface 219 and the facing surface 42 of the ring 4. Reference $l_1$ designates the axial distance between the edge $B_2$ and the front end of the surface 14 which, in the example shown in the figures, is a circle 141 representing the junction between this surface 14 and a chamfer 16. The distance $d_1$ is strictly less than the distance $l_1$, such that even in the event of the shutter 2 moving axially forwards relative to the body 1 as a result of momentary excess pressure in the pipe $C_1$ or as a result of rupture or deterioration of the spring 3, with the distances $d_1$ and $l_1$ varying to such an extent that the distance $d_1$ may be reduced to zero, the gasket 6 continues to bear against the surface 14. This ensures sealing for the element A even in the event of the member 2 moving axially relative to the body 1.

The safety parts of the element A, i.e. the spring 3, the ring 4, and the segment 5 are disposed inside the body 1, so they are protected during relative movement between the plates 10A and 10B.

Since the force $F_1$ is distributed around the axis $X_2$, the spring 3 ensures a rapid return for the member 2 into the middle configuration, i.e. into a configuration in which the axis $X_2$ is substantially in alignment with a central axis of the housing 15 whenever the male element A is extracted from the female element B, and this is advantageous.

The domed nature of the front face 1021 of the pusher 102 provides effective contact with the valve member 24, thereby reducing the risks of jamming during the movement of this valve member in the duct 225.

The invention is shown for the situation in which the element fitted with a body and a pivoting coupling member is the male element A of the coupling R. Nevertheless, the invention is also applicable to the configuration in which it is the female element that is fitted with the hinge coupling member. Under such circumstances, and as in the embodiment shown, the female element presents a flared internal entry surface serving to guide the pivoting of the female element during coupling.

Whatever the embodiment, the friction force $F_7$ results from the normal contact force between the surfaces 216 and 12 and from the coefficient of friction of these surfaces. This force decreases with increasing pressure in the pipe $C_1$, such that the force to be exerted in order to overcome the opposite torque due to friction is relieved by the pressure that exists in the pipe $C_1$. The maximum force to be exerted at the end of the shutter is reached when there is no pressure in the pipe $C_1$, thereby facilitating tests for validating operation of the coupling.

The invention is shown for a fluid that flows in the coupling R from the pipe $C_1$ towards the pipe $C_2$. Nevertheless, it is possible for the flow to take place in the opposite direction.

The invention claimed is:

1. An element of a quick coupling for releasably connecting together two pipes, the element comprising; a body for fastening on a support, and an elongate coupling member fitted with a closure valve member and mounted in the body so that the elongated coupling member can pivot, a sealing gasket being disposed between the body and the coupling member, wherein the element includes a spring exerting a resilient force on a flange portion of the coupling member that faces towards a rear of the element and that is adapted for pressing a first surface of the coupling member against a surface of the body, and wherein the coupling member is provided with a second surface for bearing against an axial abutment in the event of the coupling member being moved towards a front of the element relative to the body.

2. An element according to claim 1, wherein the resilient force is greater than a pressure force exerted on the coupling member by fluid present in a pipe connected to the body.

3. An element according to claim 1, wherein the sealing gasket is placed in a groove formed at a periphery of a projecting rear end of the first surface, the flange portion being substantially cylindrical on a circular base and being received, in the body, in a hollow housing of corresponding shape.

4. An element according to claim 3, wherein a portion of an outer radial surface of a projecting rear end that is situated, relative to the groove beside the first surface, is of a diameter that is greater than a diameter of another portion of the outer radial surface of the projecting rear end that is situated, relative to the groove, opposite from the first surface.

5. An element according to claim 3, wherein an axial distance between firstly an edge of the groove situated on a side of the groove that is beside the first surface, and secondly a front end of a radial surface of the hollow housing for receiving the projecting rear end, is a value that is greater than a value of an axial distance between the second surface of the coupling member and the abutment.

6. An element according to claim 1, wherein the axial abutment is formed by a component fitted inside the body.

7. An element according to claim 1, wherein the spring is placed around the coupling member in a housing formed by the body.

8. An element according to claim 7, wherein the spring is disposed between the axial abutment and an outer shoulder of the coupling member that faces towards the front of the element.

9. An element according to claim 1, wherein the coupling member includes two portions, a rear portion received in the body and forming the first and second surfaces, and a front portion projecting from the body.

10. An element according to claim 9, wherein an inside diameter of the axial abutment is less than a maximum outside diameter of one or more zones of the coupling member disposed between the axial abutment and a front end of the coupling member.

11. An element according to claim 1, wherein the element is a male element of the coupling.

12. An element according to claim 11, wherein the front end of the coupling member for penetrating into a corresponding female coupling element has a diameter less than a diameter of at least one intermediate zone of the coupling member that projects beyond the body.

13. An element according to claim 1, wherein the body is able adapted for being fastened on a drive plate supporting a plurality of coupling members.

14. A quick coupling for releasably connecting together two pipes, wherein the coupling includes a first coupling element according to claim 1.

15. A coupling according to claim 14, wherein a second element of the coupling has a flared entry surface for receiving one end of the coupling member bearing slidably thereagainst.

16. A coupling according to claim 14, wherein the second element is fitted with a closure valve member.

17. A coupling according to claim 14, wherein the second element includes a pusher suitable for applying an axial force on the valve member of the first element to move the valve member relative to the coupling member, and wherein a front face of the pusher is domed.

* * * * *